UNITED STATES PATENT OFFICE.

WILLIAM A. GILLESPIE, OF LOUISA COURT HOUSE, VIRGINIA, ASSIGNOR OF ONE-HALF INTEREST TO JAMES W. FLANAGAN, OF TEXAS.

IMPROVEMENT IN PRESERVING MEAT, &c.

Specification forming part of Letters Patent No. 125,285, dated April 2, 1872.

SPECIFICATION.

*To all whom it may concern:*

Be it known that I, WILLIAM A. GILLESPIE, of Louisa Court House, Louisa county, Virginia, have invented a new Method of Preserving Meats and Fruits; and I hereby declare that the following is a full, clear, and exact description of my process for preserving the same any length of time and in any climate.

I place the substances to be preserved in air-tight vessels of tin, glass, earthen, or stoneware, or any vessel that will perfectly exclude the air. I then put in fresh water to fill the interstices, so as to drive out the air. I then invert the vessel, the top of which should be closed previously air-tight, except a small hole, through which hydrogen gas is passed in a trough filled with water, so that the rim of the inverted vessel be covered with water. Then, with a flexible tube, I convey the hydrogen gas through the small aperture left into the jar. The gas will rise in the vessel containing the substance to be preserved until it displaces the water in the interstices and takes its place. Then cork up the vessel while under water; then remove and thoroughly seal or close the aperture air-tight.

No substance can decay without air, or oxygen, which is a constituent of air, and the vessel must be made perfectly impervious to air. Hydrogen gas can be readily made, and cheaply, by putting scraps of iron in a cask, covered with water, then pouring in gradually sulphuric acid, (oil vitriol,) adding the same from time to time to keep up the production of hydrogen gas; then, by attaching the flexible tube to the hole in the cask or vessel, (which is to be tight elsewhere,) the gas is conveyed to the trough and under water, through under the hole into the vessel holding the meats or fruits to be preserved.

Claim.

What I claim as new, and wish to secure by Letters Patent, is—

The process herein described for preserving meat, vegetables, &c., by inclosing them in a can or chamber and surrounding them with hydrogen gas introduced by the displacement of water, in the manner herein specified.

WM. A. GILLESPIE.

Witnesses:
HENRY W. MURRAY,
FRANK V. WINSTON.